US011226596B2

(12) United States Patent
Iijima et al.

(10) Patent No.: US 11,226,596 B2
(45) Date of Patent: *Jan. 18, 2022

(54) ELECTRONIC TIMEPIECE

(71) Applicant: Seiko Epson Corporation, Tokyo (JP)

(72) Inventors: Yoshitaka Iijima, Omachi (JP); Yasuhiro Momose, Matsumoto (JP); Takaya Masaki, Matsumoto (JP)

(73) Assignee: Seiko Epson Corporation

( * ) Notice: Subject to any disclaimer, the term of this patent is extended or adjusted under 35 U.S.C. 154(b) by 912 days.

This patent is subject to a terminal disclaimer.

(21) Appl. No.: 15/970,258

(22) Filed: May 3, 2018

(65) Prior Publication Data

US 2018/0253066 A1    Sep. 6, 2018

Related U.S. Application Data

(63) Continuation of application No. 15/471,177, filed on Mar. 28, 2017, now Pat. No. 9,989,932.

(30) Foreign Application Priority Data

Mar. 29, 2016   (JP) .................................. 2016-065658
May 20, 2016   (JP) .................................. 2016-101057

(51) Int. Cl.
*G04G 21/02*   (2010.01)
*G01C 5/06*    (2006.01)
(Continued)

(52) U.S. Cl.
CPC .............. *G04G 21/02* (2013.01); *G01C 5/06* (2013.01); *G04B 19/04* (2013.01); *G04B 19/048* (2013.01);
(Continued)

(58) Field of Classification Search
CPC ...... G04B 19/04; G04B 47/06; G04B 47/066; G04B 19/048; G04C 3/14; G01C 5/06
See application file for complete search history.

(56) References Cited

U.S. PATENT DOCUMENTS 5,500,835 A * 3/1996 Born ...................... G04C 3/146
                                                                        368/11
5,802,016 A * 9/1998 Kubota .................. G04C 3/008
                                                                        368/11
(Continued)

FOREIGN PATENT DOCUMENTS

| JP | 2004-004129 A | 1/2004 |
| JP | 2013-032919 A | 2/2013 |
| JP | 2015-169493 A | 9/2015 |

*Primary Examiner* — Daniel P Wicklund
(74) *Attorney, Agent, or Firm* — Harness, Dickey & Pierce, P.L.C.

(57) ABSTRACT

An electronic timepiece includes: a 6 o'clock information display unit that displays one display mode among a plurality of display modes including a barometric display mode in which a barometric pressure is displayed, using a first display hand; a 10 o'clock information display unit that displays a change in the barometric pressure using a second hand in a case in which the display mode displayed by the 6 o'clock information display unit is the barometric display mode; a 2 o'clock information display unit that displays the barometric pressure using measurement display hands in the case in which the display mode displayed by the 6 o'clock information display unit is the barometric display mode; and a time display unit that displays a time using an hour hand and a minute hand irrespective of the display mode.

12 Claims, 8 Drawing Sheets

(51) Int. Cl.
  *G04B 19/04*  (2006.01)
  *G04C 3/14*  (2006.01)
  *G04B 47/06*  (2006.01)

(52) U.S. Cl.
  CPC ........... *G04B 47/06* (2013.01); *G04B 47/066* (2013.01); *G04C 3/14* (2013.01)

(56) References Cited

U.S. PATENT DOCUMENTS

| | | | |
|---|---|---|---|
| 5,889,736 A * | 3/1999 | Fujita | G04C 10/04 368/66 |
| 6,490,230 B1 | 12/2002 | Sakuyama et al. | |
| 6,751,164 B1 * | 6/2004 | Sekiguchi | G04C 3/146 368/21 |
| 8,848,491 B2 | 9/2014 | Miyake | |
| 9,740,171 B2 * | 8/2017 | Nagahama | G04C 3/14 |
| 9,760,063 B2 | 9/2017 | Hasegawa | |
| 2004/0016058 A1 * | 1/2004 | Gardiner | G01C 17/00 7/119 |
| 2011/0069589 A1 | 3/2011 | Plancon et al. | |
| 2013/0033970 A1 | 2/2013 | Miyake | |
| 2014/0286138 A1 * | 9/2014 | Hasegawa | G04C 3/14 368/80 |
| 2015/0146503 A1 * | 5/2015 | Nakanishi | G04G 9/0076 368/21 |
| 2015/0253739 A1 * | 9/2015 | Iida | G04R 20/04 368/80 |
| 2015/0277387 A1 | 10/2015 | Hasegawa | |
| 2016/0209813 A1 | 7/2016 | Hasegawa | |
| 2016/0327915 A1 | 11/2016 | Katzer et al. | |
| 2016/0378068 A1 | 12/2016 | Nakanishi | |
| 2018/0231515 A1 * | 8/2018 | Voumard | G04G 9/0005 |

* cited by examiner

ELECTRONIC TIMEPIECE

CROSS-REFERENCE TO RELATED APPLICATIONS

This application is a continuation of U.S. patent application Ser. No. 15/471,177, filed Mar. 28, 2017, which claims priority to Japanese Patent Application No. 2016-065658, filed Mar. 29, 2016, and Japanese Patent Application No. 2016-101057, filed May 20, 2016, all of which are hereby expressly incorporated by reference herein in their entireties.

BACKGROUND

1. Technical Field

The present invention relates to an electronic timepiece.

2. Related Art

JP-A-2013-32919 discloses an electronic timepiece that displays a time and information (altitude, temperature, and barometric pressure) different from the time using an hour hand, a minute hand, and a second hand.

The electronic timepiece disclosed in JP-A-2013-32919 displays information (altitude, temperature, and barometric pressure) different from a time using the hour hand, the minute hand, and the second hand. Therefore, when the information different from a time is displayed, time display which is a most basic function of the electronic timepiece may not be executed.

SUMMARY

An advantage of some aspects of the invention is to provide a technology for enabling time display when information different from a time is displayed using a pointing hand.

An electronic timepiece according to an aspect of the invention has a plurality of display modes including a barometric display mode in which a barometric pressure is displayed. The electronic timepiece includes: a first display unit that includes a first pointing hand and displays one display mode among the plurality of display modes using the first pointing hand; a second display unit that includes a second pointing hand and displays a change in the barometric pressure using the second pointing hand in a case in which the display mode displayed by the first display unit is the barometric display mode; a third display unit that includes a third pointing hand and displays the barometric pressure using the third pointing hand in the case in which the display mode displayed by the first display unit is the barometric display mode; and a time display unit that includes an hour hand and a minute hand and displays a time using the hour hand and the minute hand irrespective of the display mode.

According to the aspect of the invention, the time display unit displays a time using the hour hand and the minute hand irrespective of the display mode even when the first display unit displays the barometric display mode using the first pointing hand, the second display unit displays the change in the barometric pressure using the second pointing hand, and the third display unit displays the barometric pressure using the third pointing hand. Therefore, time display can continue when information (the barometric display mode, the change in the barometric pressure, and the barometric pressure) different from a time is displayed using the pointing hand. The information regarding the barometric pressure, such as the barometric display mode, the change in the barometric pressure, and the barometric pressure, can be displayed with other pointing hands, and thus the information regarding the barometric pressure is easily viewed.

In the electronic timepiece according to the aspect of the invention, it is preferable that the plurality of display modes include a time display mode in which the time is displayed, and the second display unit displays a second in the time using the second pointing hand in a case in which the display mode displayed by the first display unit is the time display mode.

According to the aspect of the invention with this configuration, the second display unit can display a second in a time in the case in which the display mode is the time display mode. The second display unit can display a plurality of kinds of information according to the display modes.

In the electronic timepiece according to the aspect of the invention, it is preferable that the time display unit includes the first, second, and third display units, and the first display unit is disposed in the time display unit so that a rotation axis of the first pointing hand is located between a first straight line in a direction oriented from 6 o'clock to 12 o'clock of the time display unit including a rotation axis of the second pointing hand and a second straight line in the direction oriented from 6 o'clock to 12 o'clock of the time display unit including a rotation axis of the third pointing hand.

According to the aspect of the invention with this configuration, the first display unit that displays the display mode related to display of the second display unit and display of the third display unit is disposed between the second and third display units in the direction oriented from 3 o'clock to 9 o'clock of the time display unit. Therefore, the first, second, and third display units are easily viewed.

In the electronic timepiece according to the aspect of the invention, it is preferable that the time display unit includes a fourth pointing hand, the third display unit displays a numerical value of digits equal to or greater than predetermined digits in a numerical value of the barometric pressure using the third pointing hand in a case in which the display mode displayed by the first display unit is the barometric display mode, the fourth pointing hand displays a numerical value of digits less than the predetermined digits in the numerical value of the barometric pressure in the case in which the display mode displayed by the first display unit is the barometric display mode, and the fourth pointing hand is longer than the first, second, and third pointing hands.

According to the aspect of the invention with this configuration, since the fourth pointing hand longer than the first, second, and third pointing hands displays the numerical value of the digits less than the predetermined digits in the numerical value of the barometric pressure, the numerical value of the digits less than the predetermined digits in the numerical value of the barometric pressure can be conspicuous. In general, in a numerical value of a barometric pressure, values of lower digits than values of upper digits vary more easily. Therefore, when the fourth pointing hand displays the numerical value of the digits less than the predetermined digits in the numerical value of the barometric pressure, a variation in the barometric pressure can be displayed to be conspicuous more than in a case in which the first, second, or third pointing hand displays the numerical value of the digits less than the predetermined digits in the numerical value of the barometric pressure.

In the electronic timepiece according to the aspect of the invention, it is preferable that the plurality of display modes include an altitude display mode in which an altitude is displayed, the third display unit displays a numerical value of digits equal to or greater than specific digits in a numerical value of the altitude using the third pointing hand in a case in which the display mode displayed by the first display unit is the altitude display mode, and the fourth pointing hand displays a numerical value of digits less than the specific digits in the numerical value of the altitude in the case in which the display mode displayed by the first display unit is the altitude display mode.

According to the aspect of the invention with this configuration, since the fourth pointing hand longer than the first, second, and third pointing hands, the hour hand, and the minute hand displays the numerical value of the digits less than the specific digits in the numerical value of the altitude, the numerical value of the digits less than the specific digits in the numerical value of the altitude can be conspicuous. In general, in a numerical value of an altitude, values of lower digits than values of upper digits vary more easily. Therefore, when the fourth pointing hand displays the numerical value of the digits less than the specific digits in the numerical value of the altitude, a variation in the altitude can be displayed to be conspicuous more than in a case in which the first, second, or third pointing hand or the hour or minute hand displays the numerical value of the digits less than the specific digits in the numerical value of the altitude.

In the electronic timepiece according to the aspect of the invention, it is preferable that, in the case in which the display mode displayed by the first display unit is the altitude display mode and a case in which the altitude is a negative value, the second display unit uses the second pointing hand to display that the altitude is the negative value.

According to the aspect of the invention with this configuration, it is possible to display that the altitude is the negative value. The second display unit can display the plurality of kinds of information according to the display mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments of the invention will be described with reference to the drawings. The dimensions and scales of the units in the drawing are appropriately different from actual dimensions and scales. The embodiments to be described below are specific preferred examples suitable for the invention. Therefore, in the embodiments, various technically preferred limitations are imposed. However, the scope of the invention is not limited to such forms unless otherwise mentioned to particularly limit the invention in the following description.

Figure 1:
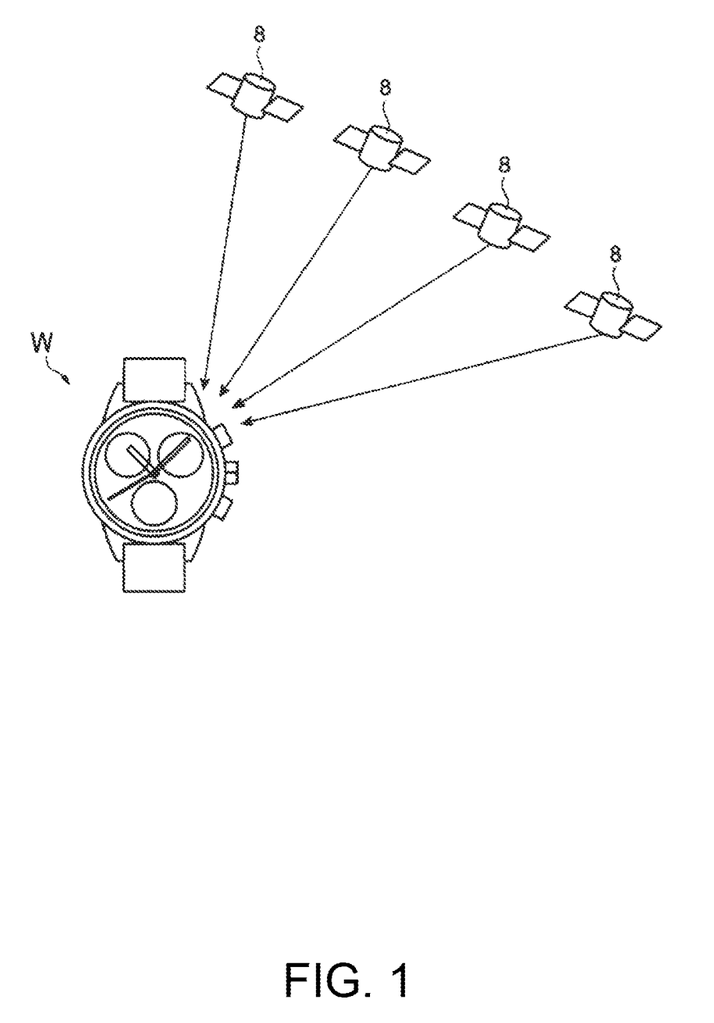
FIG. 1 is an overall diagram illustrating GPS including an electronic timepiece according to an embodiment of the invention.

FIG. 1 is an overall view illustrating GPS including an electronic timepiece W with a sensor (hereinafter simply referred to as an "electronic timepiece") according to the embodiment. The electronic timepiece W obtains positional information and time information of a current site using radio waves which are examples of external signals.

The electronic timepiece W is a wristwatch that receives radio waves (satellite signals) from GPS satellites 8 and corrects a measured time of an internal timepiece. The electronic timepiece W displays a time or the like on an opposite surface (hereinafter referred to as a "front surface") to a surface (hereinafter referred to as a "rear surface") on a side coming into contact with an arm. The GPS satellites 8 are navigation satellites that turn around a predetermined orbit above the Earth. The GPS satellites 8 transmit radio waves (L1 waves) with 1.57542 GHz on which a navigation message is superimposed, to the ground. In the following description, radio waves with 1.57542 GHz on which a navigation message is superimposed are referred to as satellite signals. The satellite signals are circularly polarized waves of right handed polarized waves.

At present, there are about 31 GPS satellites 8 (in FIG. 1, only four satellites are illustrated). To identify which satellite signal is transmitted from which GPS satellite 8, each GPS satellite 8 superimposes a unique pattern with 1023 bits (a period of 1 ms) called a C/A code (coarse/acquisition code) on a satellite signal. Each bit is one of +1 and −1. Therefore, the C/A code is seen to be a random pattern.

An atomic clock is mounted on the GPS satellite 8. The satellite signal includes considerably accurate GPS time information measured by the atomic clock. A negligible time error of the atomic clock mounted on each GPS satellite 8 is measured by a ground control segment. The satellite signal also includes a time correction parameter for correcting that time error. The electronic timepiece W receives a satellite signal (radio waves) transmitted from one GPS satellite 8 and uses an exact time (time information) obtained using the time correction parameter and the GPS time information included in the satellite signal as an internal time (a measured time of an internal timepiece).

The satellite signal also includes orbit information indicating a position of the GPS satellite 8 on the orbit. The electronic timepiece W can execute positioning calculation using the GPS time information and the orbit information.

The positioning calculation is executed on the assumption that an error is included in a measured time of the internal timepiece of the electronic timepiece W to some extent. That is, a time error is also unknown in addition to x, y, and z parameters for specifying a 3-dimensional position of the electronic timepiece W. Therefore, the electronic timepiece W receives satellite signals transmitted generally from four or more GPS satellites 8, executes the positioning calculation using the GPS time information and the orbit information included in the satellite signals, and obtains positional information of the current site.

Figure 2:
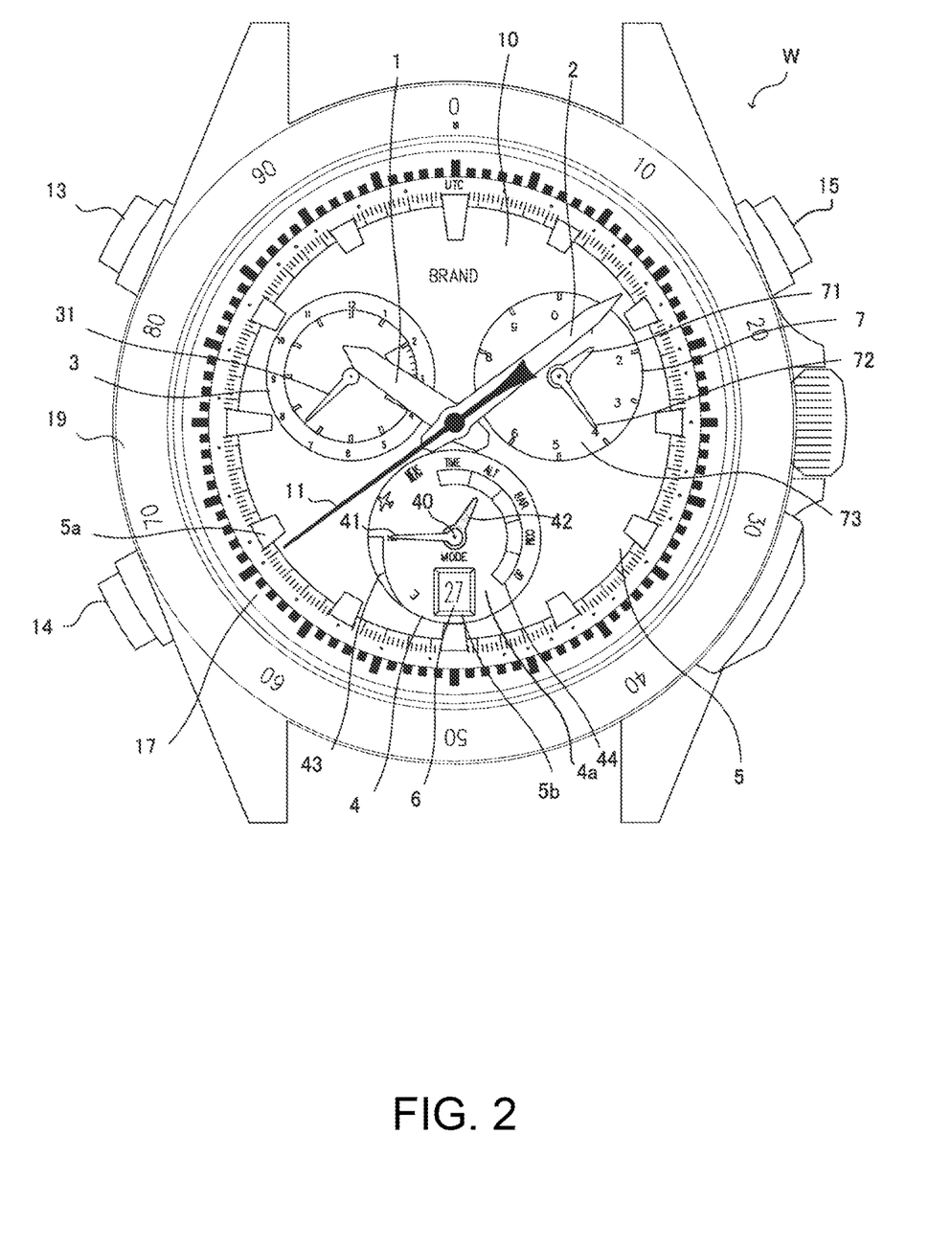
FIG. 2 is a diagram illustrating an example of the electronic timepiece according to the embodiment.

FIG. 2 is a plan view illustrating the electronic timepiece W.

Display Modes

The electronic timepiece W has a plurality of display modes including a barometric display mode in which a barometric pressure is displayed. In the description, the electronic timepiece W that has a time display mode (TIME) in which a time is displayed, an altitude display mode (ALT) in which an altitude is displayed, a barometric display mode (BAR), and an azimuth display mode (COM) in which an azimuth is displayed, and an option display mode (OP) as display modes will be exemplified. The plurality of display modes are not limited to the above-described five display modes and may be two or more display modes including at least the barometric display mode.

In the time display mode, a chronograph function (stop watch function) is validated in addition to time display.

In the option display mode, for example, a device such as a pulse sensor that measures biological information or the like is connected to the communication unit 103 (see FIG. 7) to be described below in a wireless or wired manner. The option display mode is a mode in which the biological information measured by the device is displayed. The option display mode is not limited to a mode in which the biological information is displayed, but may be appropriately changed.

Each Display Unit

The electronic timepiece W includes a 6 o'clock information display unit 4, a 2 o'clock information display unit 7, a 10 o'clock information display unit 3, and a time display unit 10.

6 O'Clock Information Display Unit 4

Figure 3:
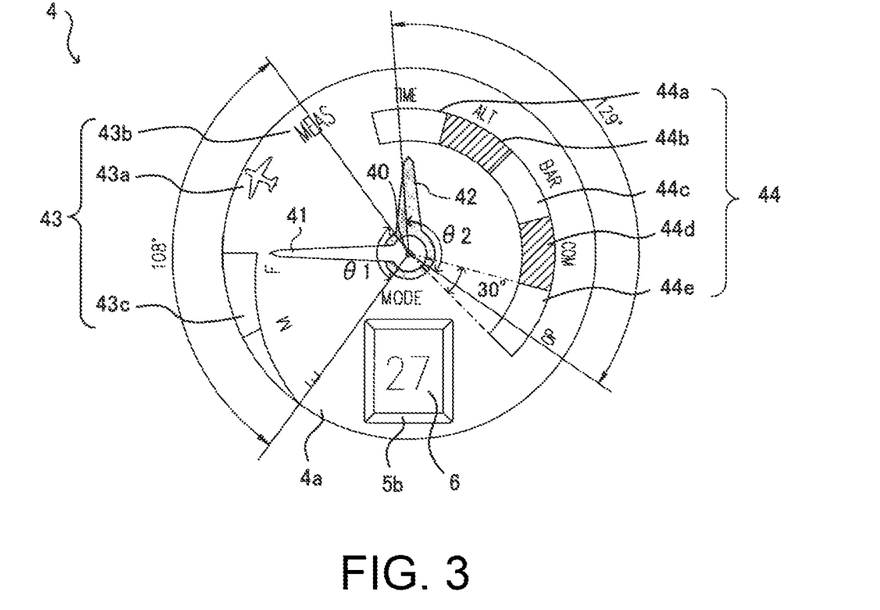
FIG. 3 is a diagram illustrating a 6 o'clock information display unit.

FIG. 3 is a diagram illustrating the 6 o'clock information display unit 4.

The 6 o'clock information display unit 4 is a circular information display unit that is disposed on the 6 o'clock side of the time display unit 10 illustrated in FIG. 2. The 6 o'clock information display unit 4 includes a first display hand 42, a second display hand 41, and a letter plate 4*a*. The first display hand 42 is an example of a first pointing hand. The first display hand 42 and the second display hand 41 rotate about a concentric axis (rotation axis) 40.

The 6 o'clock information display unit 4 displays the display modes (the time display mode, the altitude display mode, the barometric display mode, the azimuth display mode, and the option display mode) using the first display hand 42 and displays a battery residual quantity or the like using the second display hand 41. The 6 o'clock information display unit 4 is an example of a first display unit that displays one display mode among the plurality of display modes including the barometric display mode using the first pointing hand.

As illustrated in FIG. 3, in the 6 o'clock information display unit 4, an "ALT" region 44*b* corresponding to the altitude display mode, a "BAR" region 44*c* corresponding to the barometric display mode, and "COM" region 44*d* corresponding to the azimuth display mode are arranged in a line in the sequence of the "ALT" region 44*b*, the "BAR" region 44*c*, and the "COM" region 44*d*.

A region ("TIME" region) 44*a* corresponding to the time display mode is disposed on the opposite side which is the side of the "BAR" region 44*c* of the "ALT" region 44*b*. A region ("OP" region) 44*e* corresponding to the option display mode is disposed on the opposite side which is the side of the "BAR" region 44*c* of the "COM" region 44*d*.

The first display hand 42 points the "TIME" region 44*a* to display that the display mode is the time display mode. The first display hand 42 points the "ALT" region 44*b* to display that the display mode is the altitude display mode. The first display hand 42 points the "BAR" region 44*c* to display that the display mode is the barometric display mode. The first display hand 42 points the "COM" region 44*d* to display that the display mode is the azimuth display mode. The first display hand 42 points the "OP" region 44*e* to display that the display mode is the option display mode.

Then, in a rotation direction (a revolving direction) of the first display hand 42, a distance between the "ALT" region 44*b* and the "BAR" region 44*c* is shorter than a distance between the "COM" region 44*d* and the "ALT" region 44*b*. Further, a distance between the "BAR" region 44*c* and the "COM" region 44*d* is shorter than a distance between the "COM" region 44*d* and the "ALT" region 44*b*. Here, the distance between the "COM" region 44*d* and the "ALT" region 44*b* in the rotation direction (revolving direction) of the first display hand 42 means a distance between the "COM" region 44*d* and the "ALT" region 44*b* in the rotation direction (the revolving direction) of the first display hand 42 without passing through the "BAR" region 44*c*.

2 O'Clock Information Display Unit 7

Figure 4:
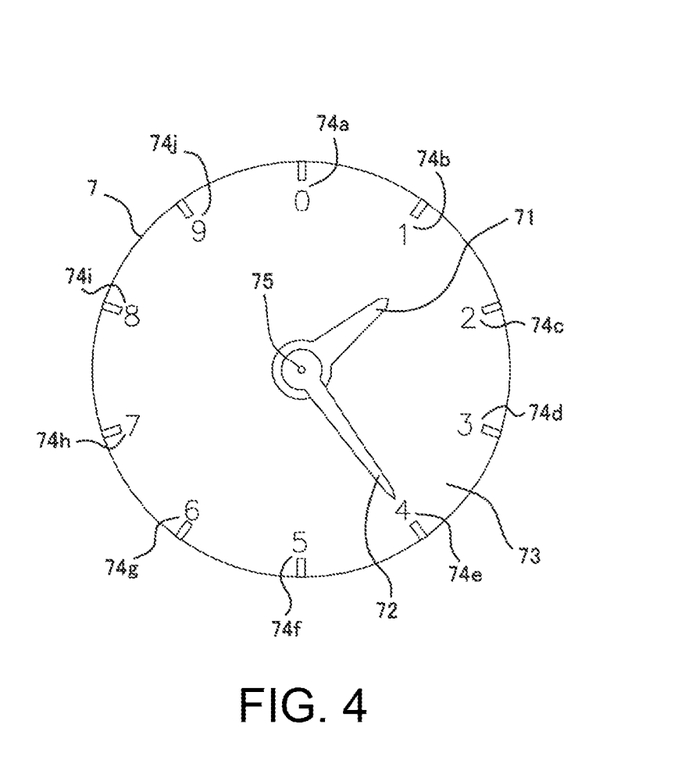
FIG. 4 is a diagram illustrating a 2 o'clock information display unit.

FIG. 4 is a diagram illustrating the 2 o'clock information display unit 7.

The 2 o'clock information display unit 7 is a circular information display unit disposed on the 2 o'clock side of the time display unit 10 illustrated in FIG. 2. The 2 o'clock information display unit 7 includes measurement display hands 71 and 72 and a letter plate 73. Each of the measurement display hands 71 and 72 is an example of a third pointing hand. The measurement display hands 71 and 72 rotate about a concentric axis (rotation axis) 75. The letter plate 73 is a member that includes scales 74*a* to 74*j* indicated by numerical values. In FIG. 4, the scales 74*a* to 74*j* are indicated by numerical values "0" to "9."

The 2 o'clock information display unit 7 displays a barometric pressure using the measurement display hands 71 and 72 in a case in which the display mode displayed in the 6 o'clock information display unit 4 is the barometric display mode. The 2 o'clock information display unit 7 is an example of a third display unit that displays a barometric pressure using the third pointing hand in a case in which the display mode displayed by the first display unit is the barometric display mode.

In the embodiment, the measurement display hand 71 displays a value of digits of a 1000 place in a numerical value of a barometric pressure. The measurement display hand 72 displays a value of digits of a 100 place in the numerical value of the barometric pressure. That is, the 2 o'clock information display unit 7 displays the numerical values of the digits equal to or greater than the digits of the 100 place in the numerical value of the barometric pressure using the measurement display hands 71 and 72. Numerical values of digits less than digits of a 100 place in a numerical value of a barometric pressure are displayed by a measurement display hand 11 (see FIG. 2) installed in the time display unit 10. The digits of the 100 place in the numerical value of the barometric pressure are examples of predetermined digits. The predetermined digits are not limited to the digits of the 100 place in the numerical value of the barometric pressure and can be appropriately changed.

The 2 o'clock information display unit 7 display an altitude using the measurement display hands 71 and 72 in a case in which the display mode displayed by the 6 o'clock information display unit 4 is the altitude display mode.

In the embodiment, the measurement display hand 71 displays a value of digits of a 1000 place in a numerical value of an altitude. The measurement display hand 72 displays a value of digits of a 100 place in the numerical value of the altitude. That is, the 2 o'clock information display unit 7 displays the numerical values of the digits equal to or greater than the digits of the 100 place in the numerical value of the altitude using the measurement display hands 71 and 72. Numerical values of digits less than the digits of the 100 place in the numerical value of the altitude are displayed by the measurement display hand 11 (see FIG. 2). The digits of the 100 place in the numerical value of the altitude are examples of specific digits. The specific digits are not limited to the digits of the 100 place in the numerical value of the altitude and can be appropriately changed.

The 2 o'clock information display unit 7 displays the scale 74a of zero using the measurement display hands 71 and 72 in a case in which the display mode displayed by the 6 o'clock information display unit 4 is the azimuth display mode. In the case in which the display mode is the azimuth display mode, the measurement display hand 11 points an azimuth of the north. That is, in the case in which the display mode is the azimuth display mode, display in the 2 o'clock information display unit 7 has no meaning, and thus the measurement display hands 71 and 72 display the scale 74a of zero.

The 2 o'clock information display unit 7 displays a value of digits of a 1 place and a value of digits of a 10 place in a numerical value of a minute in a measurement time using the measurement display hands 71 and 72 when the display mode displayed by the 6 o'clock information display unit 4 is the time display mode and a chronograph function (stop watch function) is executed. A numerical value of digits of a second in the measurement time is displayed by the measurement display hand 11.

10 O'Clock Information Display Unit 3

Figure 5:
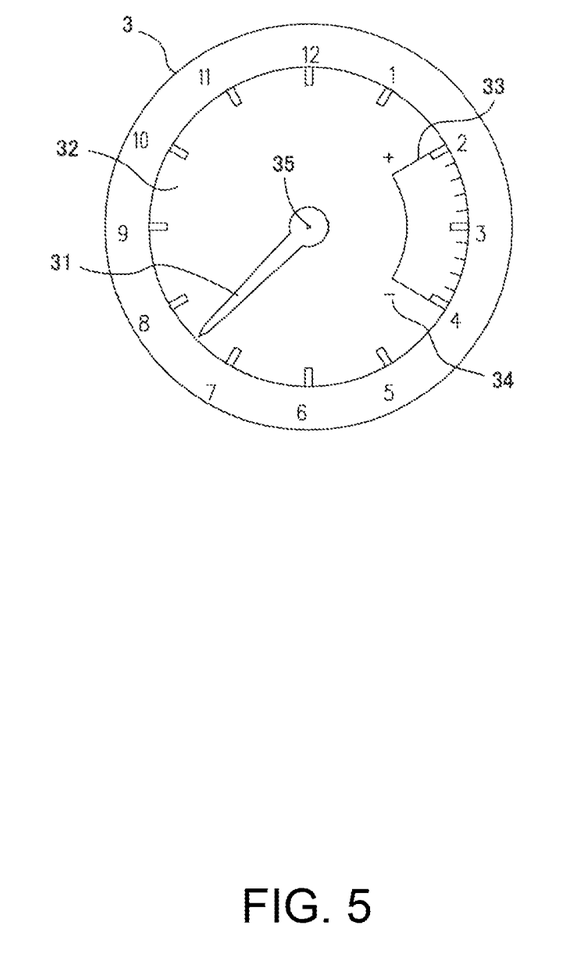
FIG. 5 is a diagram illustrating a 10 o'clock information display unit.

FIG. 5 is a diagram illustrating the 10 o'clock information display unit 3.

The 10 o'clock information display unit 3 is a circular information display unit disposed on the 10 o'clock side of the time display unit 10. The 10 o'clock information display unit 3 includes a second hand 31 and a letter plate 32. The secondhand 31 is an example of a second pointing hand. The second hand 31 rotates about a rotation axis 35.

In the letter plate 32, a barometric tendency meter 33 displaying a change in a barometric pressure between −5 hPa to +5 hPa and a "−" sign 34 indicating that an altitude is a negative value are installed.

In the barometric tendency meter 33, a number "3" described on the letter plate 32 corresponds to "0 hPa (no change), a number "2" described on the letter plate 32 corresponds to "−5 hPa", and a number "4" corresponds to "+5 hPa" described on the letter plate 32.

In a case in which the display mode displayed by the 6 o'clock information display unit 4 is the barometric display mode, the 10 o'clock information display unit 3 displays a change in a barometric pressure in a such a manner that the position of the barometric tendency meter 33 indicating the change amount is pointed by the secondhand 31. The 10 o'clock information display unit 3 is an example of a second display unit that displays a change in a barometric pressure using the second pointing hand in a case in which the display mode displayed by the first display unit is the barometric display mode.

In the embodiment, a pressure sensor 101 (see FIG. 7) to be described below intermittently measures a barometric pressure. The 10 o'clock information display unit 3 displays a spot indicating a change amount of a newly measured barometric pressure changed from a previously measured barometric pressure using the second hand 31 in the barometric tendency meter 33.

The 10 o'clock information display unit 3 displays a second in a time using the second hand 31 in a case in which the display mode displayed by the 6 o'clock information display unit 4 is the time display mode. The 10 o'clock information display unit 3 displays a second in a time using the second hand 31 in a case in which the display mode displayed by the 6 o'clock information display unit 4 is the azimuth display mode. The 10 o'clock information display unit 3 displays a second in a time using the second hand 31 in a case in which the display mode displayed by the 6 o'clock information display unit 4 is the altitude display mode in a case in which the value of the altitude is equal to or greater than 0.

The 10 o'clock information display unit 3 displays that an altitude is a negative value in a such a manner that the second hand 31 points the "−" sign 34 in a case in which the display mode displayed by the 6 o'clock information display unit 4 is the altitude display mode and a value of the altitude is a negative value.

Time Display Unit 10

The time display unit 10 includes an hour hand 1, a minute hand 2, the measurement display hand 11, the 6 o'clock information display unit 4, the 2 o'clock information display unit 7, and the 10 o'clock information display unit 3. The time display unit 10 displays a time using the hour hand 1 and the minute hand 2 irrespective of the display mode.

The measurement display hand 11 is an example of a fourth pointing hand. The measurement display hand 11 is longer than the hour hand 1, the minute hand 2, the second hand 31, the first display hand 42, the second display hand 41, and the measurement display hands 71 and 72.

Figure 6:
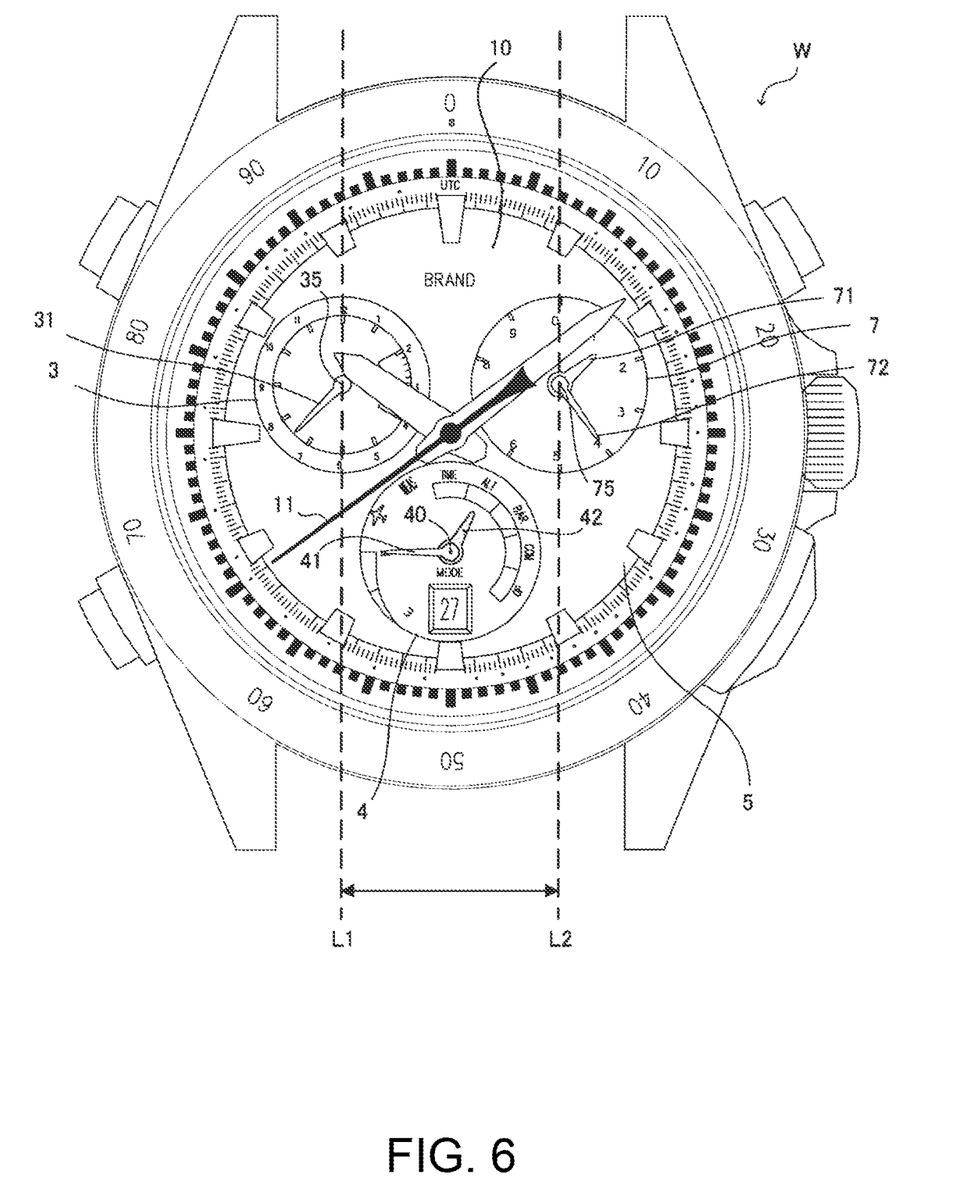
FIG. 6 is a diagram illustrating a relation between the 6 o'clock information display unit, the 2 o'clock information display unit, and the 10 o'clock information display unit.

As illustrated in FIG. 6, the 6 o'clock information display unit 4 is disposed in the time display unit 10 so that a concentric axis (rotation axis) 40 of the first display hand 42 and the second display hand 41 is located between a straight line L1 and a straight line L2. Here, the straight line L1 is a straight line in the direction oriented from 6 o'clock to 12 o'clock of the time display unit 10 including the rotation axis 35 of the second hand 31 of the 10 o'clock information display unit 3. The straight line L2 is a straight line in the direction oriented from 6 o'clock to 12 o'clock of the time display unit 10 including the concentric axis (the rotation axis) 75 of the measurement display hands 71 and 72 of the 2 o'clock information display unit 7.

Configuration of Electronic Timepiece W

Figure 7:
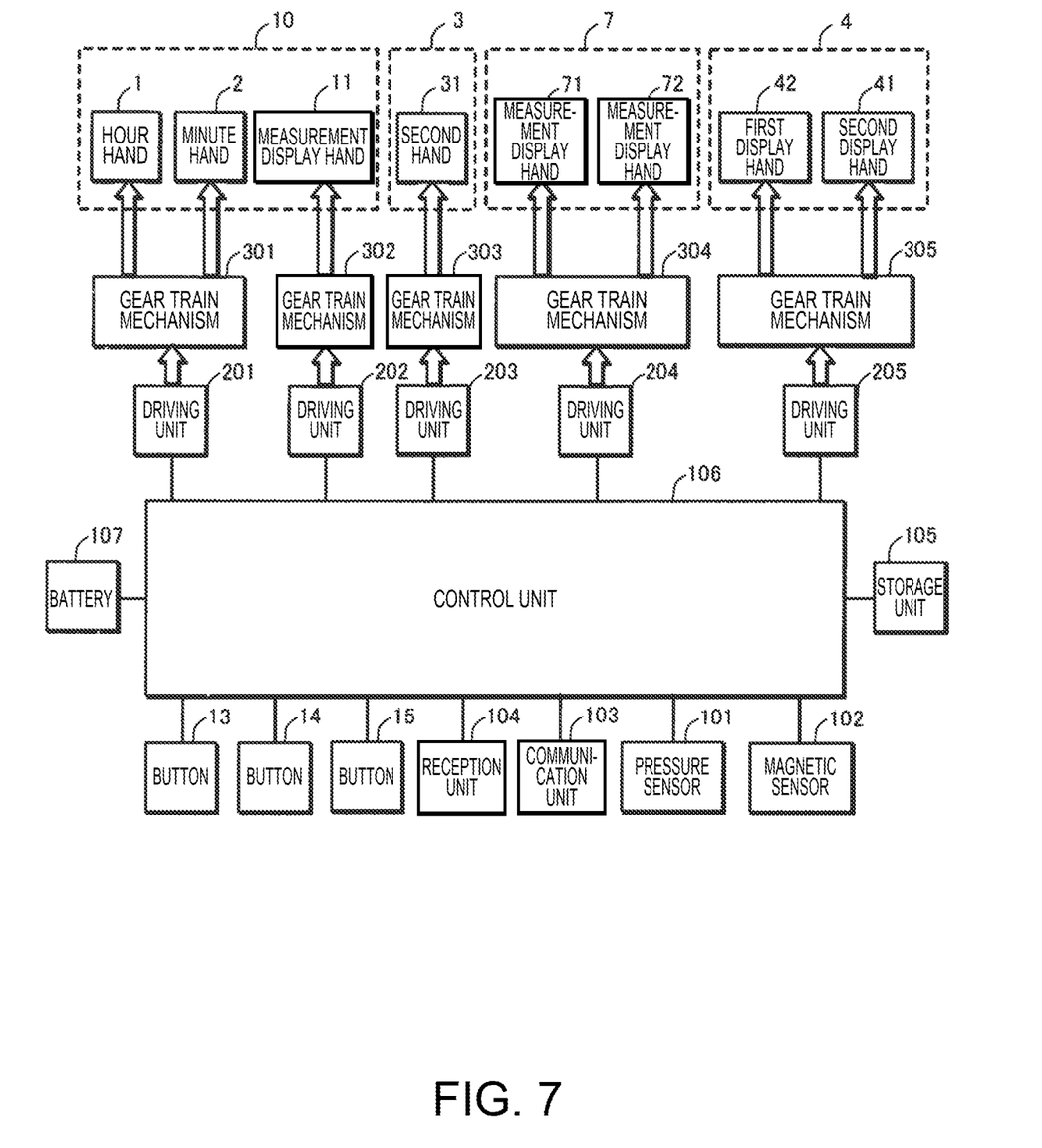
FIG. 7 is a block diagram illustrating the configuration of the electronic timepiece.

FIG. 7 is a block diagram illustrating the configuration of the electronic timepiece W.

The electronic timepiece W receives radio waves containing time information and corrects a display time based on the time information.

As a configuration related to the time display unit 10, the electronic timepiece W includes the hour hand 1, the minute hand 2, the measurement display hand 11, gear train mechanisms 301 and 302, and driving units 201 and 202. The driving units 201 and 202 are, for example, step motors. The driving unit 201 drives the hour hand 1 and the minute hand 2 via the gear train mechanism 301. The driving unit 202 drives the measurement display hand 11 via the gear train mechanism 302.

The electronic timepiece W includes the second hand 31, a gear train mechanism 303, and a driving unit 203 as a configuration related to the 10 o'clock information display unit 3. The driving unit 203 is, for example, a step motor. The driving unit 203 drives the second hand 31 via the gear train mechanism 303.

The electronic timepiece W includes the measurement display hands 71 and 72, a gear train mechanism 304, and a driving unit 204 as a configuration related to the 2 o'clock information display unit 7. The driving unit 204 is, for example, a step motor. The driving unit 204 drives the measurement display hands 71 and 72 via the gear train mechanism 304.

The electronic timepiece W includes the first display hand 42, the second display hand 41, a gear train mechanism 305, and the driving unit 205 as a configuration related to the 6 o'clock information display unit 4. The driving unit 205 is, for example, a step motor. The driving unit 205 drives the first display hand 42 and the second display hand 41 via the gear train mechanism 305.

The electronic timepiece W further includes the pressure sensor 101, a magnetic sensor 102, a communication unit 103, a reception unit 104, buttons 13 to 15, a storage unit 105, a control unit 106, and a battery 107.

The pressure sensor 101 measures a barometric pressure. An altitude is obtained from the barometric pressure measured by the pressure sensor 101. The magnetic sensor 102 measures geomagnetism. The communication unit 103 communicates with a device such as a pulse sensor that is used in the option display mode and measures biological information or the like in a wireless or wired manner. The reception unit 104 includes an antenna, processes satellite signals received via the antenna, and acquires GPS time information or positional information.

The button 13 receives a user manipulation (pressing manipulation) of starting the stop watch function and a user manipulation (pressing manipulation) of ending the stop watch function in the time display mode. The button 14 receives a user manipulation (pressing manipulation) of switching the display mode. The button 15 receives a user manipulation (pressing manipulation) of starting measurement of an altitude in the altitude display mode, a user manipulation (pressing manipulation) of starting measurement of an azimuth in the azimuth display mode, and a user manipulation (pressing manipulation) of starting measurement of a barometric pressures in the barometric display mode. Instead of the button 13, the button 15 may receive a user manipulation (pressing manipulation) of starting the stop watch function and a user manipulation (pressing manipulation) of ending the stop watch function in the time display mode.

The storage unit 105 stores a program that defines an operation of the control unit 106 and a table indicating a relation between a barometric pressure and an altitude. The control unit 106 is, for example, a CPU and controls the electronic timepiece W by reading a program stored in the storage unit 105 and executing the program. For example, the control unit 106 includes an internal timepiece (not illustrated) and corrects a measured time of the internal timepiece according to GPS time information. The battery 107 is used as a power supply of the electronic timepiece W.

Details of Electronic Timepiece W

The details of the electronic timepiece W will be described.

In the electronic timepiece W, as illustrated in FIG. 2, a letter plate 5 is disposed on the inner circumferential side of the dial ring 17 and the bezel 19 is disposed on the outer circumferential side of the dial ring 17 in a form circularly concentric with the dial ring 17. The hour hand 1 and the minute hand 2 are mounted on the letter plate 5. At a position corresponding to the hour hand 1 of the letter plate 5, a scale 5a on a 12-hour clock is formed in an annular shape. In a direction indicating 10 o'clock of the letter plate 5, the 10 o'clock information display unit 3 on which a second hand 31 is mounted is formed.

The electronic timepiece W includes the measurement display hand 11. In the altitude display mode, for example, the measurement display hand 11 displays a value (a corresponding value among 0 to 99) indicated by digits of a 1 place and a 10 place among numerical values of the altitude specified from outputs of the pressure sensor 101. Specifically, the measurement display hand 11 displays a numeral of digits of a 1 place and a 10 place in a measurement result of an altitude using the 100 partitioned scales in the dial ring 17. The 2 o'clock information display unit 7 in which the measurement display hands 71 and 72 displaying values of digits of a 100 place and a 1000 place in the measurement result of the altitude are fitted is formed in the direction indicating 2 o'clock of the letter plate 5. In the example illustrated in FIG. 2, the measurement display hands 71 and 72 indicate an altitude of 1400 m and the measurement display hand 11 indicates an altitude of 65 m. Thus, the user can understand that the altitude is 1465 m.

As illustrated in detail in FIG. 3, a letter plate 4a of the 6 o'clock information display unit 4 includes a first display region 44 and a second display region 43. The first display region 44 and the second display region 43 are disposed to be adjacent to each other so that the regions 44 and 43 do not overlap each other.

The second display region 43 is a range formed in a fan shape in which a central angle centering on a concentric axis 40 is θ1 (=108°). The second display region 43 is an example of a region which can be pointed by the second display hand 41.

The first display region 44 is a range which is formed in an arc shape in which a central angle centering on the concentric axis 40 is θ2 (=129°). The first display region 44 is an example of a region which can be pointed by the first display hand 42. The display regions 43 and 44 are partitioned into a plurality of display units in accordance with a rotation angle in the concentric axis 40.

A region (43c) indicating a battery residual quantity and regions (43a and 43b) indicating operation states of the electronic timepiece W are installed in the second display region 43. The second display hand 41 displays a battery residual quantity by pointing a region indicting the battery residual quantity. The second display hand 41 displays an operation state of the electronic timepiece W by pointing a region indicating an operation state of the electronic timepiece W.

The operation states of the electronic timepiece W include "wireless stop progress" meaning reception stop of radio waves containing time information and "measurement progress" meaning that measurement corresponding to the display mode displayed by the first display hand 42 (measurement of a time in altitude, azimuth, or barometric pressure, or a stop watch function) is being executed.

In the embodiment, a battery residual quantity meter 43c, an icon 43a indicating wireless stop progress, and a "MEAS" letter 43b indicating "measurement progress" are installed in the second display region 43. A region in which the icon 43a is located and a region in which the "MEAS" letter 43b is located are examples of a region corresponding to an operation state of the electronic timepiece W. The region in which the "MEAS" letter 43b is located is adjacent to the first display region 44.

The second display hand 41 selectively displays a battery residual quantity and an operation state of the electronic timepiece W through rotation about the concentric axis 40 in the second display region 43.

On the other hand, the first display hand 42 displays a current display mode (one of the time display mode, the altitude display mode, the azimuth display mode, the barometric display mode, and the option display mode) through rotation about the concentric axis 40 in the first display region 44.

Each display mode also indicates a kind of measured value in the display mode. For example, the time display mode indicates a time or an hour as a kind of measured value, the altitude display mode indicates an altitude as a kind of measured value, the azimuth display mode indicates an azimuth as a kind of measured value, the barometric display mode indicates a barometric pressure as a kind of measured value, and the option display mode indicates biological information as a kind of measured value.

The second display hand 41 moves in the range of 108° from the "MEAS" position to the "E" position (emptiness; an empty position) in a range of ±54° centering on an "F" position (a full position) and displays second information (a battery residual quantity and an operation state of the electronic timepiece W).

When a wireless function (a function of receiving radio waves containing time information) is not usable as in a case in which a user carrying the electronic timepiece W is boarding on an airplane and the user manipulates a button (for example, the user executes a manipulation of simultaneously pushing the buttons 13 and 15), the second display hand 41 points the icon 43a indicating wireless stop progress.

The first display region 44 includes the "TIME" region 44a, the "ALT" region 44b, the "BAR" region 44c", the "COM" region 44d, and the "OP" region 44e.

In the first display region 44, a current display mode is displayed by selectively pointing display units (the "TIME" region, the "ALT" region, the "BAR" region, the "COM" region, and the "OP" region) 44a to 44e of the display modes by the first display hand 42. Each of the "TIME" region 44a, the "ALT" region 44b, the "BAR" region 44c, the "COM" region 44d, and the "OP" region 44e is installed as a region in which a central angle is 30° centering on the concentric axis 40.

In the embodiment, the display units 44a to 44e of the display modes are indicated by letters written in a region formed in a belt-like arc shape. Specifically, "TIME" (time), "ALT" (altitude), "BAR" (barometric pressure), "COM" (compass: azimuth), and "OP" (option) are indicated as the display units 44a to 44e.

The display mode displayed at a pointing position of the first display hand 42, that is, the display mode displayed in the first display region 44, can be switched through a manipulation of pressing a button 14. Whenever the button 14 is pressed once, the control unit 106 switches the point pointed by the first display hand 42 to the "TIME" region 44a, the "ALT" region 44b, the "BAR" region 44c, the "COM" region 44d, and the "OP" region 44e.

When the button 14 is pressed in a situation in which the first display hand 42 points the option display mode (the "OP" mode), the control unit 106 reverses the first display hand 42 and moves the first display hand 42 to the "TIME" region 44a (a region of the time display mode).

In the example illustrated in FIG. 3, the second display hand 41 points the battery residual quantity "F" (full) and the first display hand 42 points the time display mode.

An information display unit 5b that transmits a date wheel 6 displaying a calendar is formed in a direction in which 6 o'clock of the letter plate 4a of the 6 o'clock information display unit 4 is pointed. The information display unit 5b displays a date of a calendar which is an example of third information. The information display unit 5b is disposed to be fixed on a straight line binding the 12 o'clock side and the 6 o'clock side and passing through the concentric axis 40 so that the symmetric design of the entire electronic timepiece W is realized.

Here, an example of an operation of the control unit 106 will be described.

When the control unit 106 detects that the button 15 is pressed in a situation in which the display mode is the altitude display mode, the control unit 106 outputs an operation start signal to the pressure sensor 101 to cause the pressure sensor 101 to start measurement of a barometric pressure and controls the driving unit 205 such that the second display hand 41 points a position indicating the "MEAS" letter 43b.

When the pressure sensor 101 receives the operation start signal and starts the measurement of the barometric pressure and subsequently ends the measurement of the barometric pressure, the pressure sensor 101 outputs a measurement result of the barometric pressure to the control unit 106.

When the control unit 106 receives the measurement result of the barometric pressure, the control unit 106 specifies an altitude according to the measurement result of the barometric pressure with reference to the table stored in the storage unit 105. Subsequently, the control unit 106 controls the driving units 202 and 204 such that the 2 o'clock information display unit 7 and the measurement display hand 11 display a measurement result of the altitude and controls the driving unit 205 such that the second display hand 41 points a position indicating the battery residual quantity meter 43c.

For the display of the altitude, the control unit 106 controls the driving unit 204 such that the measurement display hand 71 displays a value of digits of a 1000 place in a numerical value of the altitude and the measurement display hand 72 displays a value of digits of a 100 place in the numerical value of the altitude and controls the driving unit 202 such that the measurement display hand 11 displays a numerical value of digits less than digits of a 100 place in the numerical value of the altitude.

In a case in which the measurement result of the altitude is a negative value, the control unit 106 controls the driving unit 203 and causes the second hand 31 to point the "−" sign 34.

When the control unit 106 detects that the button 15 is pressed in a situation in which the display mode is the azimuth display mode, the control unit 106 outputs the operation start signal to the magnetic sensor 102, starts the magnetic sensor 102 to measure geomagnetism, and controls the driving unit 205 such that the second display hand 41 points the position indicating the "MEAS" letter 43b.

When the operation start signal is received, the magnetic sensor 102 starts measuring the geomagnetism. Thereafter, when the measurement of the geomagnetism ends, a measurement result of the geomagnetism is output to the control unit 106.

When the measurement result of the geomagnetism is received, the control unit 106 controls the driving unit 202, causes the measurement display hand 11 to display the measurement result (the azimuth of the north) of the geomagnetism, and controls the driving unit 205 such that the second display hand 41 points the position indicating the battery residual quantity meter 43c.

When the control unit 106 detects that the button 15 is pressed in a situation in which the display mode is the barometric display mode, the control unit 106 outputs an operation start signal to the pressure sensor 101 to cause the pressure sensor 101 to start measurement of a barometric pressure and controls the driving unit 205 such that the second display hand 41 points a position indicating the "MEAS" letter 43b.

When the pressure sensor 101 receives the operation start signal and starts the measurement of the barometric pressure and subsequently ends the measurement of the barometric pressure, the pressure sensor 101 outputs a measurement result of the barometric pressure to the control unit 106.

When the control unit 106 receives the measurement result of the barometric pressure, the control unit 106 controls the driving units 202 and 204 such that the 2 o'clock information display unit 7 and the measurement display hand 11 display the measurement result of the barometric pressure, controls the driving unit 203 such that the second hand 31 displays the spot indicating the change amount of a newly measured barometric pressure changed from the previously measured barometric pressure in the barometric tendency meter 33, and controls the driving unit 205 such that the second display hand 41 points the position indicating the battery residual quantity meter 43c.

For the display of the barometric pressure, the control unit 106 controls the driving unit 204 such that the measurement display hand 71 displays a value of digits of a 1000 place in a numerical value of the barometric pressure and the measurement display hand 72 displays a value of digits of a 100 place in the numerical value of the barometric pressure and controls the driving unit 202 such that the measurement display hand 11 displays a numerical value of digits less than digits of a 100 place in the numerical value of the barometric pressure.

Even when the control unit 106 does not detect that the button 15 is pressed in the barometric display mode, the control unit 106 may start an operation of the pressure sensor 101 periodically (for example, intervals of 3 hours). In a case in which the pressure sensor 101 periodically measures the barometric pressure, the control unit 106 may control the driving unit 205 such that the second display hand 41 points the position indicating the "MEAS" letter 43b or may not instruct the second display hand 41 to point the "MEAS" letter 43b but may instruct the battery residual quantity meter 43c.

The control unit 106 controls the driving unit 201 such that the hour hand 1 and the minute hand 2 display a time, irrespective of the display mode.

In the electronic timepiece W according to the above-described embodiment, even when the 6 o'clock information display unit 4 displays the barometric display mode using the first display hand 42, the 10 o'clock information display unit 3 displays the change in the barometric pressure using the secondhand 31, and the 2 o'clock information display unit 7 displays the barometric pressure using the measurement display hands 71 and 72, the time display unit 10 displays a time using the hour hand 1 and the minute hand 2 irrespective of the display mode. Therefore, a time can be displayed when information (the barometric display mode, the change in the barometric pressure, and the barometric pressure) different from the time is displayed using the pointing hand. The information regarding the barometric pressure, such as the barometric display mode, the change in the barometric pressure, and the barometric pressure, can be displayed with the other pointing hands, and thus the information regarding the barometric pressure can be easily viewed.

The 6 o'clock information display unit 4 displaying the display mode related to the display of the 10 o'clock information display unit 3 and the display of the 2 o'clock information display unit 7 is disposed between the second and third display units in the direction oriented from 3 o'clock to 9 o'clock of the time display unit 10. Therefore, the 10 o'clock information display unit 3, the 2 o'clock information display unit 7, and the 6 o'clock information display unit 4 are easily viewed.

When the altitude or the barometric pressure is displayed, the measurement display hand 11 which is the longest among the pointing hands of the electronic timepiece W displays the numerical value of the digits on the lower side of the numerical value of the altitude or the barometric pressure. Therefore, the numerical value of the digits on the lower side of the numerical value of the altitude or the barometric pressure can be conspicuous. In general, in a numerical value of an altitude or a barometric pressure, values of lower digits than values of upper digits vary more easily. Therefore, when the measurement display hand 11 which is the longest among the pointing hands of the electronic timepiece W displays the numerical value of the digits on the lower side of the numerical value of the altitude or the barometric pressure, a variation in the altitude or the barometric pressure can be displayed to be conspicuous more than in a case in which the other pointing hands display the numerical value of the digits on the lower side of the numerical value of the altitude or the barometric pressure.

In the embodiment, in a region in which the second display region 43 and the first display region 44 do not overlap each other, on a straight line passing through the concentric axis 40 and binding the 12 o'clock side and the 6 o'clock side, the information display unit 5b displaying the date wheel 6 of a calendar is disposed to be fixed as a third display region in which the third information is displayed. Therefore, a symmetric property of design can be emphasized, and thus it is possible to improve stability of design.

Modification Examples

The invention is not limited to the above-described embodiment. For example, various modification examples to be described below can be realized. Further, one modification example or a plurality of modification examples selected arbitrarily from the modification embodiments to be described below can also be appropriately combined.

In the above-described embodiment, as illustrated in FIGS. 2 and 3, display of the battery residual quantity meter 43c is divided into 3 stages of "E" (empty), "M" (middle), and "F" (full), but the number of display stages of the battery residual quantity meter 43c is not limited to 3 and can be appropriately changed.

Figure 8:
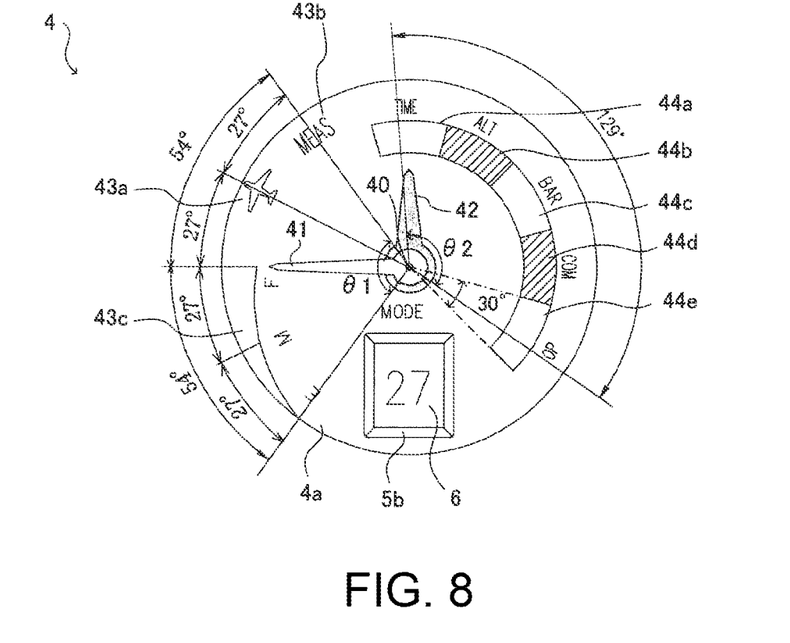
FIG. 8 is a plan view illustrating an example of the 6 o'clock information display unit.
Figure 9:
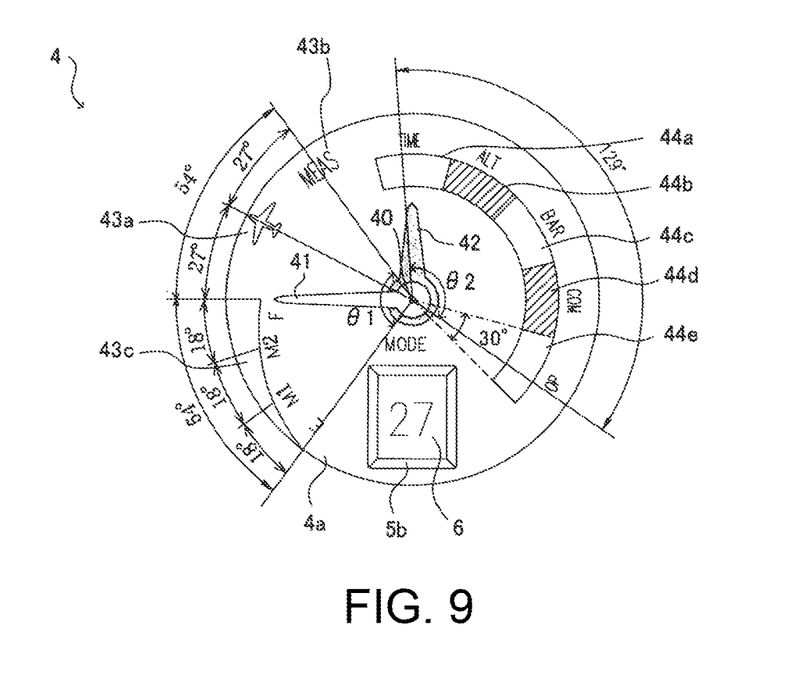
FIG. 9 is a plan view illustrating a modification example of the 6 o'clock information display unit.

FIG. 8 is a diagram illustrating an example of divided angles of the battery residual quantity meter 43c in a case in which display of the battery residual quantity meter 43c is divided into 3 stages, as illustrated in FIGS. 2 and 3. FIG. 9 is a diagram illustrating an example of divided angles of the battery residual quantity meter 43c in a case in which display of the battery residual quantity meter 43c is divided into 4 stages ("E", "M1" (middle 1), "M2" (middle 2), and "F"). Here, a relation of "M1"<"M2" is assumed to be established as the battery residual quantity. In either the case of the example illustrated in FIG. 8 or the case of the example illustrated in FIG. 9, the battery residual quantity meter 43c is a region in which a central angle is 54° on the letter plate 4a.

As illustrated in FIG. 8, in a case in which the display of the battery residual quantity meter 43c is divided into 3 stages, the battery residual quantity meter 43c can be divided into "E", "M", and "F" at a central angle 27° on the letter plate 4a. On the other hand, as illustrated in FIG. 9, in a case in which the display of the battery residual quantity meter 43c is divided into 4 stages, the battery residual quantity meter 43c can be divided into "E", "M1", "M2", and "F" at a central angle 18° on the letter plate 4a.

At this time, the second display hand 41 preferably operates at intervals of angles obtained by diving 360° by 4n (where n is a natural number less than 15). Hereinafter, this point will be described.

For example, in a case in which the second display hand 41 is configured to operate at the intervals of the angles obtained by diving 360° by 4n, the second display hand 41 is used for many timepieces. It is difficult to achieve common use of the driving mechanism and components operating the pointing hand at intervals of angles obtained by dividing 360° by 60. However, it is possible to lengthen a distance by which the second display hand 41 advances in one-time operation and it is possible to shorten the number of operations (that is, a switching time) associated with switching of the display to ⅔.

The invention is not limited to the modification example. In a case in which the second display hand 41 is configured to operate at the intervals of the angles obtained by diving 360° by 4n, the 6 o'clock information display unit 4 can execute display symmetrically on the upper, lower, left, and right sides (here, the upper, lower, left, and right sides correspond to the 12 o'clock side, the 6 o'clock side, the 9 o'clock side, and the 3 o'clock side) with the second display hand 41. Even in a case in which the battery residual quantity meter 43c is configured, as illustrated in FIG. 8 or 9, the second display hand 41 can also correspond to any display (a battery residual quantity meter of 3 divisions and a battery residual quantity meter of 4 divisions), for example, by configuring the second display hand 41 operating at the intervals of the angles obtained by diving 360° by 4n.

Figure 10:
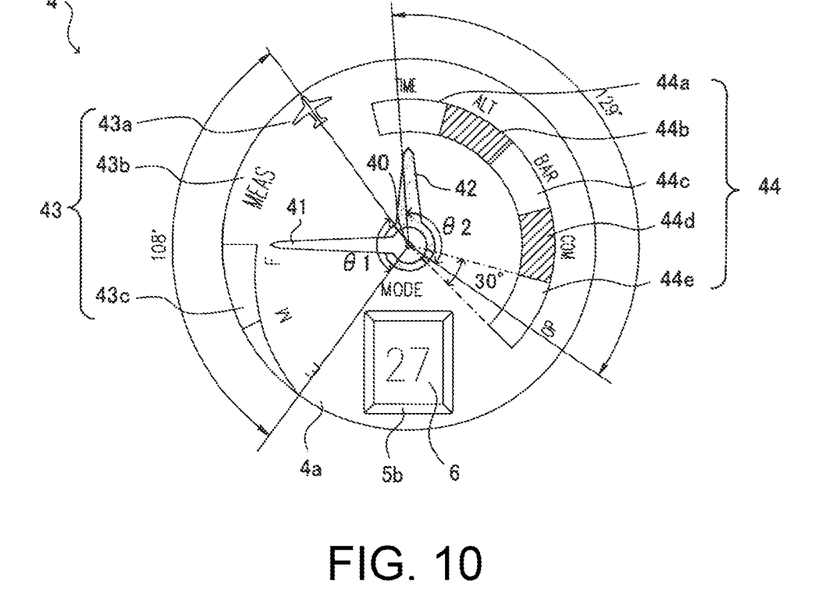
FIG. 10 is a plan view illustrating another modification example of the 6 o'clock information display unit.
Figure 11:
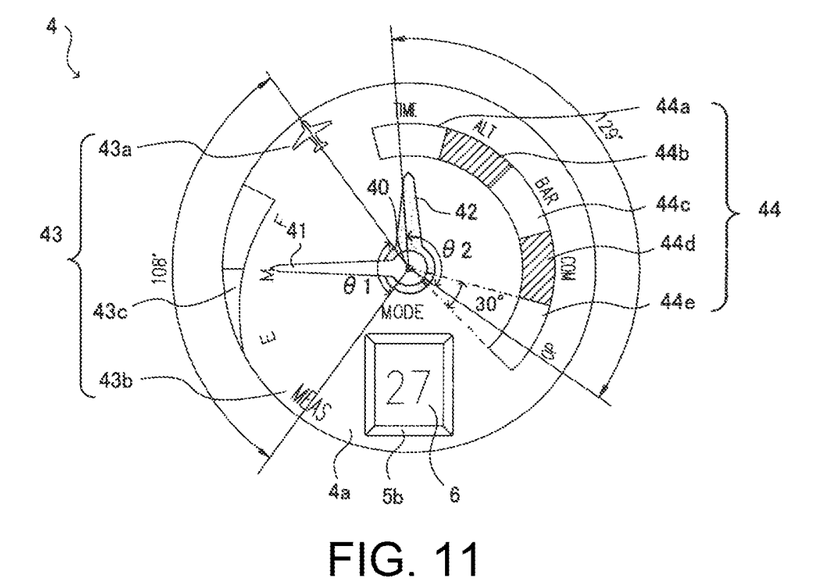
FIG. 11 is a plan view illustrating still another modification example of the 6 o'clock information display unit.

In the 6 o'clock information display unit 4 illustrated in FIG. 2 or 3, the region in which the icon 43a is disposed and the region in which the "MEAS" letter 43b is disposed may be exchanged, as illustrated in FIG. 10. As illustrated in FIG. 11, the battery residual quantity meter 43c may be disposed between the region in which the icon 43a is disposed and the region in which the "MEAS" letter 43b is disposed.

In the case of the example illustrated in FIG. 10 or 11, the vicinity of the battery residual quantity meter 43c serves as a region of the "MEAS" letter 43b.

The measurement of a barometric pressure, an altitude, and an azimuth is considered to be frequently used in accordance with a situation of a use scene at the time of mountain climbing or yacht voyage (for example, a use scene at the time of bad weather). Therefore, the vicinity of the battery residual quantity meter 43c can serve as the region of the "MEAS" letter 43b and it is possible to reduce the number of driving steps of the driving unit (for example, a step motor) 205 necessary to switch the position pointed by the second display hand 41 from the region of the battery residual quantity meter 43c to the region of the "MEAS" letter 43b. Accordingly, it is possible to achieve a reduction in power consumption.

In the foregoing embodiment, the arrangement sequence of the "ALT" region 44b, the "BAR" region 44c, and the "COM" region 44d may be appropriately changed.

In the above-described embodiment and modification examples, a primary battery has been exemplified as the power supply. However, the invention is not limited thereto and any power supply may be used. For example, a secondary battery may be used as the power supply. In this case, the secondary battery may be charged with an external commercial power supply of 100 V. Further, a solar battery panel is contained in the electronic timepiece W and the secondary battery may be charged with power generated by the solar battery panel.

What is claimed is:

1. An electronic timepiece that has a plurality of display modes including a barometric display mode in which a barometric pressure is displayed, the electronic timepiece comprising:
    a first display unit that includes a first pointing hand and displays one display mode among the plurality of display modes using the first pointing hand;
    a second display unit that includes a second pointing hand and displays the barometric pressure using the second pointing hand in a case in which the display mode displayed by the first display unit is the barometric display mode; and
    a time display unit that includes an hour hand and a minute hand and displays a time using the hour hand and the minute hand irrespective of the display mode,
    wherein the time display unit includes the first and second display units and a third pointing hand,
    wherein the second display unit displays a numerical value of digits equal to or greater than predetermined digits in a numerical value of the barometric pressure using the second pointing hand in a case in which the display mode displayed by the first display unit is the barometric display mode,
    wherein the third pointing hand indicates a numerical value of digits less than the predetermined digits in the numerical value of the barometric pressure in the case in which the display mode displayed by the first display unit is the barometric display mode, and
    wherein the third pointing hand is longer than the first pointing hand and is longer than the second pointing hand.

2. The electronic timepiece according to claim 1,
    wherein the time display unit includes a third display unit including a fourth pointing hand and displaying a change in the barometric pressure using the fourth pointing hand in the case in which the display mode displayed by the first display unit is the barometric display mode,
    wherein the plurality of display modes include a time display mode in which the time is displayed, and
    wherein the third display unit displays a second in the time using the fourth pointing hand in a case in which the display mode displayed by the first display unit is the time display mode.

3. The electronic timepiece according to claim 2,
    wherein the first display unit is disposed in the time display unit so that a rotation axis of the first pointing hand is located between a first straight line in a direction oriented from 6 o'clock to 12 o'clock of the time display unit including a rotation axis of the fourth pointing hand and a second straight line in the direction oriented from 6 o'clock to 12 o'clock of the time display unit including a rotation axis of the second pointing hand.

4. The electronic timepiece according to claim 1, wherein the plurality of display modes includes an altitude display mode in which an altitude is displayed, wherein the second display unit displays a numerical value of digits equal to or greater than specific digits in a numerical value of the altitude using the second pointing hand in a case in which the display mode displayed by the first display unit is the altitude display mode, and wherein the third pointing hand indicates a numerical value of digits less than the specific digits in the numerical value of the altitude in the case in which the display mode displayed by the first display unit is the altitude display mode.

5. The electronic timepiece according to claim 4, wherein in the case in which the display mode displayed by the first display unit is the altitude display mode and a case in which the altitude is a negative value, the third display unit uses the fourth pointing hand to display that the altitude is the negative value.

6. The electronic timepiece according to claim 5, wherein the third display unit further includes a plate displaying a minus sign when the altitude is the negative value.

7. An electronic timepiece comprising:
a first subdial that displays one display mode of a plurality of possible display modes, the first subdial including a first pointer;
a second subdial that displays a barometric pressure when the first subdial indicates a barometric display mode, the second, subdial including a second pointer; and
a dial having an hour hand and a minute hand and displaying a time using the hour hand and the minute hand irrespective of the display mode,
wherein the first and second subdials are disposed on the dial,
wherein the second subdial displays a numerical value of digits greater than or equal to a 100 place of a numerical value of the barometric pressure using the second pointer when the first subdial indicates the barometric display mode,
wherein a third pointer indicates a numerical value of digits less than the 100 place in the numerical value of the barometric pressure when the first subdial indicates the barometric display mode, and wherein the third pointer is longer than the first pointer and is longer than the second pointer.

8. The electronic timepiece according to claim 7, further comprising:
a third subdial that includes a fourth pointer and displays a change in the barometric pressure using the fourth pointer when the first subdial indicates the barometric display mode,
wherein the plurality of display modes includes a time display mode in which the time is displayed, and
wherein the third subdial displays a second in the time when the display mode displayed by the first subdial is the time display mode.

9. The electronic timepiece according to claim 8, the first subdial is disposed in the dial so that a rotation axis of the first pointer is located between a first straight line including a rotation axis of the fourth pointer and a second straight line including a rotation axis of the second pointer, the first straight line and the second straight line extending parallel to an axis through 6 o'clock and 12 o'clock on the dial.

10. The electronic timepiece according to claim 7, wherein the plurality of possible display modes includes an altitude display mode in which an altitude is displayed,
wherein the second subdial displays a numerical value of digits equal to or greater than digits of the 100 place in a numerical value of the altitude using the second pointer when the first subdial indicates the altitude display mode, and
wherein the third pointer indicates a numerical value of digits less than the digits of the 100 place in the numerical value of the altitude when the first subdial indicates the altitude display mode.

11. The electronic timepiece according to claim 10, wherein when the first subdial indicates the altitude display mode and the altitude is a negative value, the third subdial uses the fourth pointer to display that the altitude is the negative value.

12. The electronic timepiece according to claim 11, wherein the third subdial further includes a plate displaying a minus sign when the altitude is the negative value and the first subdial indicates the altitude display mode.

* * * * *